(12) United States Patent
Wang et al.

(10) Patent No.: US 10,495,051 B2
(45) Date of Patent: Dec. 3, 2019

(54) POWER GENERATING DEVICE HAVING HOLLOW STRUCTURES

(71) Applicants: Chenghui Wang, Shantou (CN); Shiyi Wang, Shantou (CN)

(72) Inventors: Chenghui Wang, Shantou (CN); Shiyi Wang, Shantou (CN); Shiquan Wang, Shantou (CN)

(73) Assignees: CHENGHUI WANG, Shantou (CN); SHIYI WANG, Shantou (CN)

( * ) Notice: Subject to any disclaimer, the term of this patent is extended or adjusted under 35 U.S.C. 154(b) by 6 days.

(21) Appl. No.: 15/522,257

(22) PCT Filed: Oct. 15, 2015

(86) PCT No.: PCT/CN2015/000696
§ 371 (c)(1),
(2) Date: Oct. 10, 2017

(87) PCT Pub. No.: WO2016/065733
PCT Pub. Date: May 6, 2016

(65) Prior Publication Data
US 2018/0030952 A1    Feb. 1, 2018

(30) Foreign Application Priority Data

Oct. 27, 2014 (CN) .......................... 2014 1 0580612
May 8, 2015 (CN) .......................... 2015 1 0229855

(51) Int. Cl.
*F03B 13/10* (2006.01)
*F03B 3/04* (2006.01)
(Continued)

(52) U.S. Cl.
CPC ................ *F03B 13/10* (2013.01); *F03B 3/04* (2013.01); *F03B 13/264* (2013.01);
(Continued)

(58) Field of Classification Search
CPC ...... F03B 13/10; F03B 13/264; F03B 17/061; F03B 3/04; F05B 2220/706;
(Continued)

(56) References Cited

U.S. PATENT DOCUMENTS 328,593 A * 10/1885 Main ..................... F03B 17/061
415/7
532,595 A *  1/1895 Seivert et al. ........ F03B 17/061
415/7
(Continued)

FOREIGN PATENT DOCUMENTS

CN    88 2 02296 U    11/1988
CN    104329205 A     2/2015
(Continued)

OTHER PUBLICATIONS

International Search Report, dated Jan. 21, 2016, for International Application No. PCT/CN2015/000696, 6 pages. (with English Translation).
(Continued)

*Primary Examiner* — Tulsidas C Patel
*Assistant Examiner* — S. Mikailoff
(74) *Attorney, Agent, or Firm* — Seed IP Law Group LLP (57) ABSTRACT

A water flow power generating device, including an installing platform positioned on the water surface, a rotating mechanism on the installing platform, and a tower, a nacelle and an impeller that are positioned in water. The upper end of the tower is fixed on the rotating mechanism; the impeller consists of a hub and a plurality of blades; a central shaft of a hub is parallel to the water surface and connected to a power generator; a wheel ring is nested on a distant end of each blade remote from center of the hub; the side wall of the wheel ring is of a hollow structure or the hub is of a hollow structure; the displacement of the hollow structure of
(Continued)

the wheel ring or the hub equals the self weight of the impeller.

19 Claims, 7 Drawing Sheets

(51) Int. Cl.
    *F03B 13/26*         (2006.01)
    *F03B 17/06*         (2006.01)
    *H02K 7/18*          (2006.01)

(52) U.S. Cl.
    CPC ......... *F03B 17/061* (2013.01); *H02K 7/1823* (2013.01); *F05B 2220/706* (2013.01); *F05B 2240/93* (2013.01); *F05B 2260/20* (2013.01); *Y02E 10/223* (2013.01); *Y02E 10/28* (2013.01)

(58) Field of Classification Search
    CPC ............. F05B 2240/93; F05B 2260/20; H02K 7/1823; Y02E 10/223
    USPC ...................................... 290/43, 54
    See application file for complete search history.

(56) References Cited

U.S. PATENT DOCUMENTS

| | | | | |
|---|---|---|---|---|
| 669,852 A * | 3/1901 | Peterson | ............... | F01D 5/141 415/142 |
| 1,147,658 A * | 7/1915 | Stukes | ............... | F03B 17/063 405/76 |
| 1,432,327 A * | 10/1922 | Gawley | ............... | F03B 17/061 416/85 |
| 3,209,156 A * | 9/1965 | Struble, Jr. | ............. | F03B 13/10 290/54 |
| 3,814,961 A * | 6/1974 | Nelson | ............... | B63H 20/007 310/87 |
| 4,205,943 A * | 6/1980 | Vauthier | ............... | F03B 17/061 290/54 |
| 4,613,279 A * | 9/1986 | Corren | ............... | F03B 3/126 290/54 |
| 4,722,665 A * | 2/1988 | Tyson | ............... | F03B 3/04 415/7 |
| 4,737,070 A * | 4/1988 | Horiuchi | ............... | F03B 17/063 415/4.1 |
| 6,139,255 A * | 10/2000 | Vauthier | ............... | F03B 13/264 415/3.1 |
| 6,168,373 B1 * | 1/2001 | Vauthier | ............... | F03B 13/10 415/221 |
| 6,406,251 B1 * | 6/2002 | Vauthier | ............... | F03B 13/264 415/3.1 |
| 6,652,221 B1 * | 11/2003 | Praenkel | ............... | F03B 17/061 415/3.1 |
| 7,352,078 B2 * | 4/2008 | Gehring | ............... | F03D 9/255 290/54 |
| 7,438,504 B2 * | 10/2008 | Henriksen | ............... | B63B 21/50 114/264 |
| 8,466,574 B2 * | 6/2013 | Bear | ............... | F03B 13/264 290/53 |
| 8,736,096 B2 * | 5/2014 | Kiyose | ............... | F03B 3/12 290/43 |
| 8,847,421 B2 * | 9/2014 | Bolin | ............... | F03B 17/061 290/55 |
| 8,878,381 B2 * | 11/2014 | Henry | ............... | F03B 13/264 290/53 |
| 9,041,235 B1 * | 5/2015 | Hunter | ............... | F03B 13/00 290/54 |
| 9,506,450 B2 | 11/2016 | Kanemoto et al. | | |
| 2002/0158472 A1 * | 10/2002 | Robson | ............... | F03B 17/061 290/43 |
| 2007/0241566 A1 * | 10/2007 | Kuehnle | ............... | F03B 17/061 290/53 |
| 2010/0074750 A1 * | 3/2010 | Henriksen | ............... | B63B 21/50 416/85 |
| 2010/0176595 A1 * | 7/2010 | Bear | ............... | F03B 13/264 290/53 |
| 2013/0076038 A1 * | 3/2013 | Pitre | ............... | F03B 17/061 290/52 |
| 2013/0277980 A1 * | 10/2013 | Kiyose | ............... | F03B 3/12 290/54 |
| 2014/0145446 A1 * | 5/2014 | Earl | ............... | E02B 9/08 290/54 |
| 2014/0203564 A1 * | 7/2014 | Pitre | ............... | F03B 17/061 290/54 |
| 2015/0021919 A1 * | 1/2015 | Dehlsen | ............... | F03B 17/061 290/54 |
| 2016/0327014 A1 * | 11/2016 | Trevarthen | ............ | F03B 13/264 |
| 2017/0191465 A1 * | 7/2017 | Pitre | ............... | F03B 17/061 |
| 2018/0030952 A1 * | 2/2018 | Wang | ............... | F03B 3/04 |

FOREIGN PATENT DOCUMENTS

| | | |
|---|---|---|
| CN | 204226095 U | 3/2015 |
| CN | 104832358 A | 8/2015 |
| CN | 204663751 U | 9/2015 |
| JP | 2014-5765 A | 1/2014 |
| WO | 2014/061116 A1 | 4/2014 |

OTHER PUBLICATIONS

International Written Opinion, dated Jan. 21, 2016, for International Application No. PCT/CN2015/000696, 10 pages. (with Partial English Machine Translation).

\* cited by examiner

POWER GENERATING DEVICE HAVING HOLLOW STRUCTURES

CROSS-REFERENCE TO RELATED APPLICATIONS

This application is a Section 371 National Stage Application of International Application No. PCT/CN2015/000696, filed on 15 Oct. 2015 and entitled with "A Water Flow Power Generating Device", and claims priority to Chinese Application No. CN201410580612.2, filed on 27 Oct. 2014 and entitled with "Water Flow Power Generating Device", and to Chinese Application No. CN201510229855.6, filed on 8 May 2015 and entitled with "Efficient Water Flow Power Generating Device", the contents of which are incorporated herein by reference in their entirety.

FIELD OF THE DISCLOSURE

The present disclosure relates to a power generating device, particularly to a hydraulic power generating device, and more particularly to a water flow power generating device for generating power by means of kinetic energy generated by tidal water, sea current or water flow in a river that flow horizontally.

DESCRIPTION OF THE RELATED ART

The power generating method that utilizes the natural energy generally relates to a wind power generating method and a hydraulic power generating method. In the hydraulic power generating method, a dam is usually built in the river, and then the water level is increased. The water potential energy is used to drive the turbine to generate electricity. The setting conditions of the hydraulic power generating method are limited since a certain water level difference is necessary for the hydraulic power generating method in which the water potential energy is formed by the vertical drop of the water flow. There is a vast sea area and a vast inland river area in China. The water in the sea and river flows continuously without stopping. Thus, the water contains a huge amount of energy, but at present this huge energy has not been fully utilized and is wasted with going freely. With the continuous reduction of energy and the continuous pollution of the environment, environmentally friendly new energy has become expected and desired by the people. The utilization of water flow power generating method using tidal water, sea flow or water flow in the rivers does not produce any by-products, has a good development prospect in the environmental power generation. In recent years, the exploration, research and development in the hydraulic power generation technology is in the ascendant. It can be seen from the public information that, in the power generating device in which the electricity is generated by means of kinetic energy generated by the horizontal flow of the water, a rotating body is usually provided in the water to generate electricity by rotating the rotating body under the effect of the natural water flow. Such structures are usually divided into two types. One type is directed to the power generating devices in which the rotation axis is parallel to the horizontal plane, and the other type is directed to the power generating device in which the rotation axis is perpendicular to the horizontal plane. Since the rotating body has to overcome its own weight in the rotation process, a large water flow is required to start the power generating device. Thus, the power generation efficiency of these water flow power generating device is not high.

SUMMARY

In order to solve the above-mentioned problems, the present disclosure is intended to provide a water flow power generating device for generating power by means of kinetic energy generated by tidal water, sea current or water flow in a river that has a high power generation efficiency.

In order to achieve the above object, the water flow power generating device of the present disclosure includes an installing platform, a frequency converter and a transformer that are provided on water surface, an impeller and a generator being provided under the installing platform, wherein the water flow power generating device further includes a rotating mechanism located on the installing platform and a tower and a nacelle that are inverted in the water, the nacelle is located at an end of the tower away from the water surface and an upper end of the tower near the water surface is fixed to the rotating mechanism, wherein the impeller is composed of a hub and a plurality of blades, a central shaft of the impeller that protrudes from the bottom surface of the hub is parallel to the water surface and is connected to the generator, a wheel ring is nested on a distant end of each blade remote from center of the hub, a side wall of the wheel ring is configured to be a hollow structure or the hub is configured to be a hollow structure, and water displacement of the hollow structure of the side wall of the wheel ring or the water displacement of the hollow structure of the hub is equal to the impeller's own weight;

wherein the installing platform is fixed on the suspension frame composed of buoys, the suspension frame fixedly floats on the water surface by means of ropes and ground anchors; and wherein the generator is disposed on one side of the nacelle and transmits electricity to the frequency converter and the transformer through a cable located in the tower and the electricity is incorporated into a power grid after being frequency-converted and transformed.

DETAILED DESCRIPTION OF EMBODIMENTS

In order to reduce the resistance to the water when the water flows into the impeller and to increase the speed of the water after flowing into the impeller so as to further enhance the speed of the blades, a cross section of the side wall of the wheel ring parallel to the central shaft is of a rectangular triangle with a structure of which the front end is narrow and of which the rear end is wide.

In order that the water flowing into the impeller totally can be used to generate electricity, the distant end of each blade is connected to the side wall of the wheel ring at a torsional angle, and an intersection of the leading edge and the distant end of each blade is kept at a certain distance from the front end edge of the wheel ring.

In order to prevent the drift and rotation of the installing platform, the buoys are configured to be elongated cylindrical buoys, and the suspension frame consists of a "#" shaped frame formed by crossing a plurality of internal buoys and a square frame formed by a plurality of external buoys. One end of the internal buoys away from center of the "#" shaped frame is fixed on a side wall of the external buoy. The installing platform is located at the central opening of the "#" shaped frame. Each of four corners of the square frame is connected to a set of ropes and ground anchors, respectively.

In order to facilitate the timely adjustment of orientation of the impeller according to the direction and the flow rate of the water flow so as to achieve a stable power generation, and in order to meet the requirements of the maintenance and the cleaning of the impeller, the rotating mechanism includes a fixed base, bearings, a rotating base, a fixed top plate, a motor and a speed reducer, wherein the fixed base is configured to be a cylindrical body, the bottom of the cylindrical body being connected to the installing platform, and the top of the cylindrical body being connected to the fixed top plate, wherein the rotating base is also configured to be a cylindrical body, the rotating base is connected to the fixed base via the bearings, the bottom of the rotating base is connected to the upper end of the tower, and a pinion gear which can be engaged with a large gear is disposed on the upper outer side surface of the rotating base; and wherein the speed reducer is mounted on the fixed top plate, the motor is mounted on the speed reducer and the pinion gear is nested onto an output shaft of the speed reducer.

The installing platform is configured to be a metal plate, which has a circular hole through which the upper end of the tower can pass at the center of the metal plate, an outer edge of the metal plate is fixed onto the "#" shaped frame and the inner edge of the metal plate is connected to the fixed base of the rotating mechanism.

The height of the tower is preferably 10 to 55 m, the diameter of each blade of the impeller is preferably 9 to 100 m, the number of the blades is preferably 4 to 50, and the height of the wheel ring is preferably 0.5 to 8 m.

When the flow rate is slow and the power of the generator is low, the central shaft of the impeller is connected to a rotating shaft of the generator through a gear box.

Since the central shaft of the impeller and the gear box are in dynamic seal and are subject to a great pressure in the deep water, in order to reduce the pressure and to prevent the oil in the gear box from leaking out, an oil storage tank is provided in the tower near the water surface, wherein the oil storage tank is connected to the gear box through an oil feeding pipe, so that the pressure inside the gear box is slightly lower than the external pressure at the same level to ensure that a sealing ring between the center shaft of the impeller and the gear box is subject to a minimum pressure so as to ensure that the oil in the gear box will not leak out.

Since the central shaft of the impeller rubs with the sealing ring continuously, the sealing ring will be worn out with the lapse of the time and water may penetrate into the gear box. In order to avoid an impact on operation of the gear box after the water penetration, a water drainage hole is provided at bottom of the gear box, which water drainage hole is communicated to a water collecting tank provided on bottom of the nacelle through a water outlet pipe. A moisture detection sensor is arranged at the water drainage hole. A solenoid valve is arranged in the water outlet pipe, and a water pumping device is provided in the water collecting tank.

When the generator is a permanent magnet generator and the diameter of the rotor thereof is 2 to 10 meters, the central shaft of the impeller is directly connected to the rotating shaft of the generator.

The dynamic sealing is adopted between the central shaft of the impeller and the rotating shaft of the generator, thus, in order to avoid the damage of the sealing ring between the central shaft of the impeller and the rotating shaft of the generator due to the friction therebetween, which will result in the water penetration into the generator and affect the operation of the generator, a water drainage tank is nested onto a front end of the rotating shaft of the generator. The central shaft of the impeller passes through a circular hole disposed on the side wall of the water drainage tank and then connected to the rotating shaft of the generator. A water drainage hole is provided at bottom of the water drainage tank, and the water drainage hole is communicated to a water collecting tank provided on bottom of the nacelle through a water outlet pipe. A moisture detection sensor and a water pumping device are provided in the water collecting tank.

The frequency converter is located in the control box in which a computer, a switchgear cabinet, a power distribution box, an electric meter, a reactive power compensator, an emergency power supply, a monitoring equipment, a communication equipment and various control equipments are disposed. The control box and the transformer are located on a platform disposed between two internal buoys perpendicular to each other.

The frequency converter will generate a lot of heat in operation, thus, in order to cool the frequency converter, a heating element of the frequency converter is connected in series with a coolant storage tank, a coolant circulation pump through a coolant tube to form a cooling circulating circuit. The frequency converter, the coolant storage tank and the coolant circulation pump are located in the control box on the installing platform. The coolant tube connecting the heating element of the frequency converter and the coolant storage tank partially extends below the water surface and is connected to a cooling coil which is located at 2 to 3 meters below the water surface.

When the power generating device has stopped generating electricity for a long time and the ambient temperature around the frequency converter is higher than the temperature of the frequency converter, the hot air comes into contact with the cool heating element of the frequency converter and water beads are condensed on the heating element, which will result in the short circuit of the frequency converter. In order to avoid this, a coolant heater is provided on the coolant tube between the coolant storage tank and the coolant circulation pump.

In order to detect the direction and flow rate of the water flow in time, a water flow direction and flow rate sensor is arranged between the wheel ring and the water surface. The water flow direction and flow rate sensor is communicated to the computer in the control room. Then the computer calculates the data from the sensor and adjusts the orientation of the water wheel so as to achieve a stable power generation.

The water flow power generating device of the present disclosure has the following advantages in comparison with the conventional water flow power generating device:

1. The generator and the impeller are suspended in the water by means of the suspension frame constructed with buoys and the inverted tower mounted on the frame. By nesting the wheel ring onto the distant end of each blade of the impeller and hollowing the side wall of the wheel ring or the hub, the buoyancy of the impeller in the water is enough to counteract the impeller's own weight and the impeller rotates rapidly under the impact from the water without overcoming their own weight. The work obtained from such a rapid rotation is totally transformed into a power supply for power generation, whereby greatly improving the efficiency of power generation.

2. Since the impeller rotates in the state of weightlessness and the centrifugal force is equal to zero, the vibration of the tower can be greatly reduced and the rotation of the impeller is more stable, which can not only reduce the maintenance time and cost of the entire power generating device but also greatly save the cost of power generation while increasing the amount of power generation.

3. Except that the portion of the entire power generating device where the central shaft of the impeller is connected to the gearbox or the rotating shaft of the generator needs a dynamic seal, other portions of the power generating device do not need a dynamic seal and thus the seal performance is easy to be met.

4. By fixing the blades with the wheel ring, sufficient stiffness of the blades can be obtained with minimal amount of materials, greatly reducing the cost of a hydraulic generator.

5. The water flowing into the wheel ring totally does work to the generator due to the use of the wheel ring, avoiding the water flow partially running off in a radial direction due to the resistance of the blades and making the efficiency of the hydraulic generator higher.

6. By cooling the coolant tube of the frequency converter with the seawater, not only the cooling effect is significantly, but also the electricity in operating the device can be saved. The amount of the maintenance work can also be reduced. The cost thus can be significantly reduced.

7. The water flow power generating device of the disclosure has the advantages of simple structure, easy processing, low cost, and high power generation efficiency, can generate the electricity with the water flow rate of only 0.3 m/s, and is particularly suitable for generating electricity in the river and sea where there is a water flow along a fixed orientation.

First Example

Figure 1:
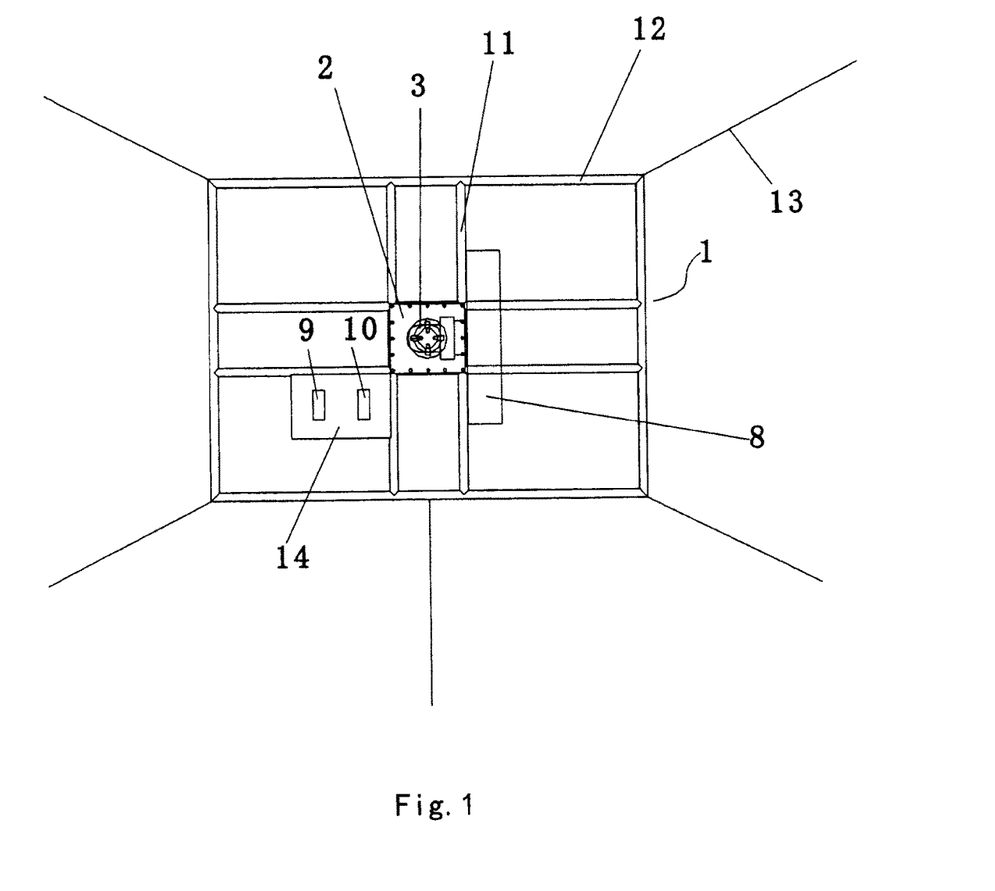
FIG. 1 is a top schematic structural view of a water flow power generating device according to the present disclosure.
Figure 2:
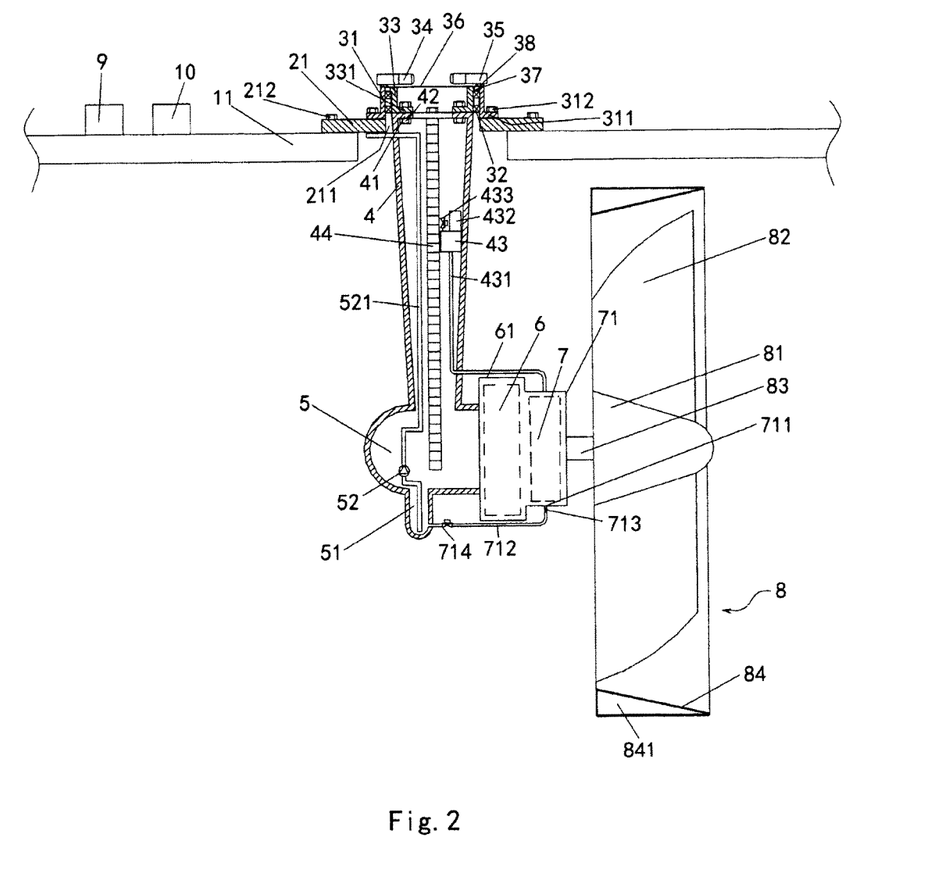
FIG. 2 is a cross-sectional schematic structural view of a water flow power generating device according to a first embodiment of the present invention.
Figure 3:
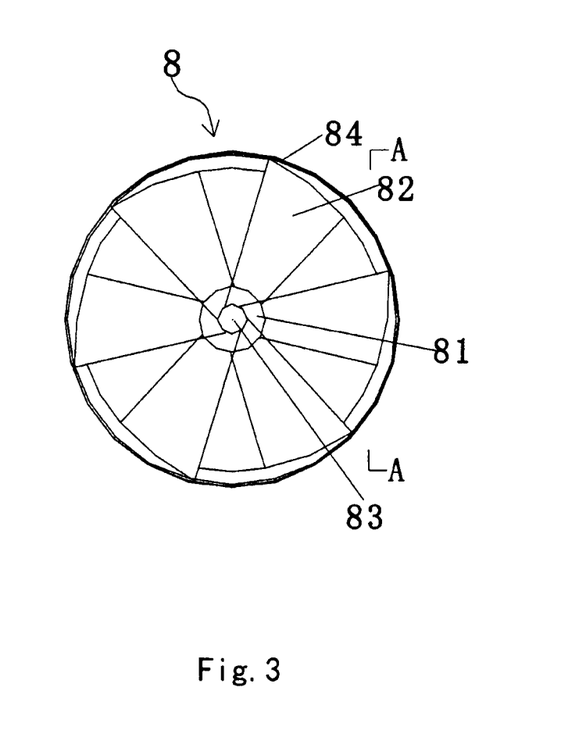
FIG. 3 is a schematic front structural view of the impeller according to the first embodiment of the present disclosure.

As shown in FIGS. 1, 2 and 3, the water flow power generating device of the present disclosure includes a suspension frame 1, an installing platform 2, a rotating mechanism 3, a tower 4, a nacelle 5, a generator 6, a gearbox 7, an impeller 8, a control room 9 and a transformer 10.

The suspension frame 1 includes a "#" shaped frame constructed by welding a plurality of internal buoys 11 to each other and a square frame formed by a plurality of external buoys 12. The buoys are configured to be elongated cylindrical buoys. One end of the internal buoys away from center of the "#" shaped frame is fixed on the side wall of the external buoys. Each of four corners of the square frame is connected to a set of ropes 13 and ground anchors, respectively. The ground anchors are cast-anchored on the ground below the water surface so that the frames fixedly float on the water surface.

The installing platform 2 is configured to be a square metal plate 21 provided with a circular hole 211 at the center of the square metal plate 21. The upper end of the tower may pass through the circular hole 211. The outer edge of the metal plate 21 is fixed onto the sides of central opening of the "#" shaped frame.

The rotating mechanism 3 includes a fixed base 31, bearings 32, a rotating base 33, a motor 34, a speed reducer 35 and a fixed top plate 36. The fixed base is cylindrical and an annular lower edge 311 extends radially outwardly from the lower end face of the fixed base. The lower edge of the fixed base is fixed to the circumference of the central circular hole of the metal plate by bolts 312 and the top of the fixed base is connected to the fixed top plate 36. The rotating base is in the form of a cylindrical shape of which the outer diameter is smaller than the inner diameter of the fixed base. The rotating base is connected to the fixed base by upper and lower bearings 32. An annular lower edge 331 extends radially inwardly from the lower end face of the rotating base. The outer side surface of the upper portion of the rotating base is provided with large gear teeth 38 that can be engaged with a pinion gear 37. The speed reducer is mounted on the fixed top plate. The motor is mounted on the speed reducer. The pinion gear is nested onto the output shaft of the speed reducer.

The tower 4 is inverted in the water. An annular upper edge 41 extends radially inwardly from the upper end face of the tower. The upper edge 41 is fixedly connected to the lower edge 331 of the rotating base. An oil storage tank 43 which is located near and below the water surface is provided inside the tower. The bottom of the oil storage tank is communicated to the top of the gear box by an oil feeding pipe 431. By doing so, it is possible for the pressure inside the gear box to be slightly lower than the external pressure at the same level to ensure that a sealing ring between the rotating shaft of the impeller and the gear box is subject to a minimum pressure so as to ensure that the oil in the gear box will not leak out. An expander 432 and a solenoid valve 433 for regulating the volume of the oil storage tank are provided on the top of the oil storage tank. A ladder 44 is provided inside the tower from the water surface to the bottom of the tower.

The nacelle 5 is located at one end of the tower away from the water surface. The generator 6 and the gear box 7 are located at one side of the nacelle. The rotating shaft of the generator is connected to the gear box. A water collecting tank 51 is provided at the bottom of the nacelle. A water pumping device 52 is provided in the water collecting tank. The water pumping device can direct the water outside the tower by a water pumping pipe 521. In order to avoid the influence of the magnetic field of the generator and the noise of the gearbox on the living creatures in the water, a magnetic field shielding layer 61 and a sound insulating layer 71 is inlayed outside the generator and the gear box. A water drainage hole 711 is provided at bottom of the gear box, and the water drainage hole is communicated to the water collecting tank through a water outlet pipe 712. A moisture detection sensor 713 is arranged at the water drainage hole and a solenoid valve 714 is arranged in the water outlet pipe.

Figure 6:
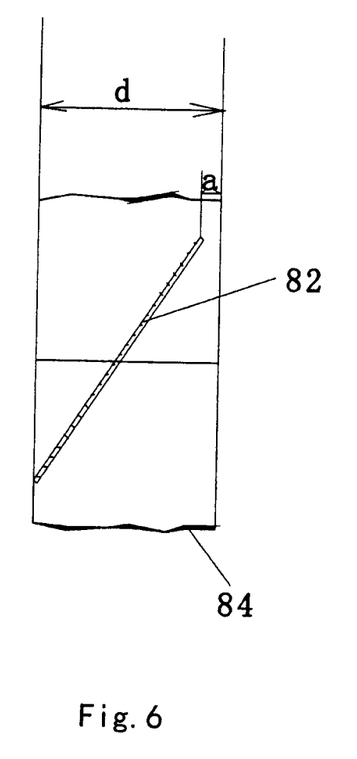
FIG. 6 is a cross-sectional view taken along a line A-A in FIG. 3 or a line B-B in FIG. 5.

The impeller 8 consists of a hub 81 and a plurality of blades 82. The axis of the hub is parallel to the water surface. The central shaft 83 of the hub is connected to the rotating shaft of the gear box. A wheel ring 84 is nested on distant end of each blade remote from the center of the hub. The distant end of each blade is connected to the side wall of the wheel ring at a torsional angle of 25° to 85°. The distance a from the intersection of leading edge and the distant end of each blade to the front end edge of the wheel ring is ¼ to ⅓ of the height d of the wheel ring, as shown in FIG. 6. The side wall of the wheel ring is configured to be a hollow structure 841 the cross section of which parallel to the central shaft is of a rectangular triangle with a structure having a narrow front end and a wide rear end. The size of the hollow structure is determined according to the impeller's own weight as long as the buoyancy of the wheel ring in the water can be counteract by the impeller's own weight.

A platform 14 is provided between two internal buoys perpendicular to each other. A control room 9 and a transformer 10 are seated on the platform. The frequency converter is located in the control room. A computer, a switchgear cabinet, a power distribution box, an electric meter, a reactive power compensator, an emergency power supply, a monitoring equipment, a communication equipment and various control equipments are also disposed in the control room. In order to detect the direction and flow rate of the water flow in time, a water flow direction and flow rate sensor, not shown in the Figures, is arranged between the wheel ring and the water surface. The water flow direction and rate sensor is communicated to the computer in the control room. Then the computer calculates the data from the sensor and adjusts the orientation of the water wheel so as to achieve a stable power generation.

Figure 7:
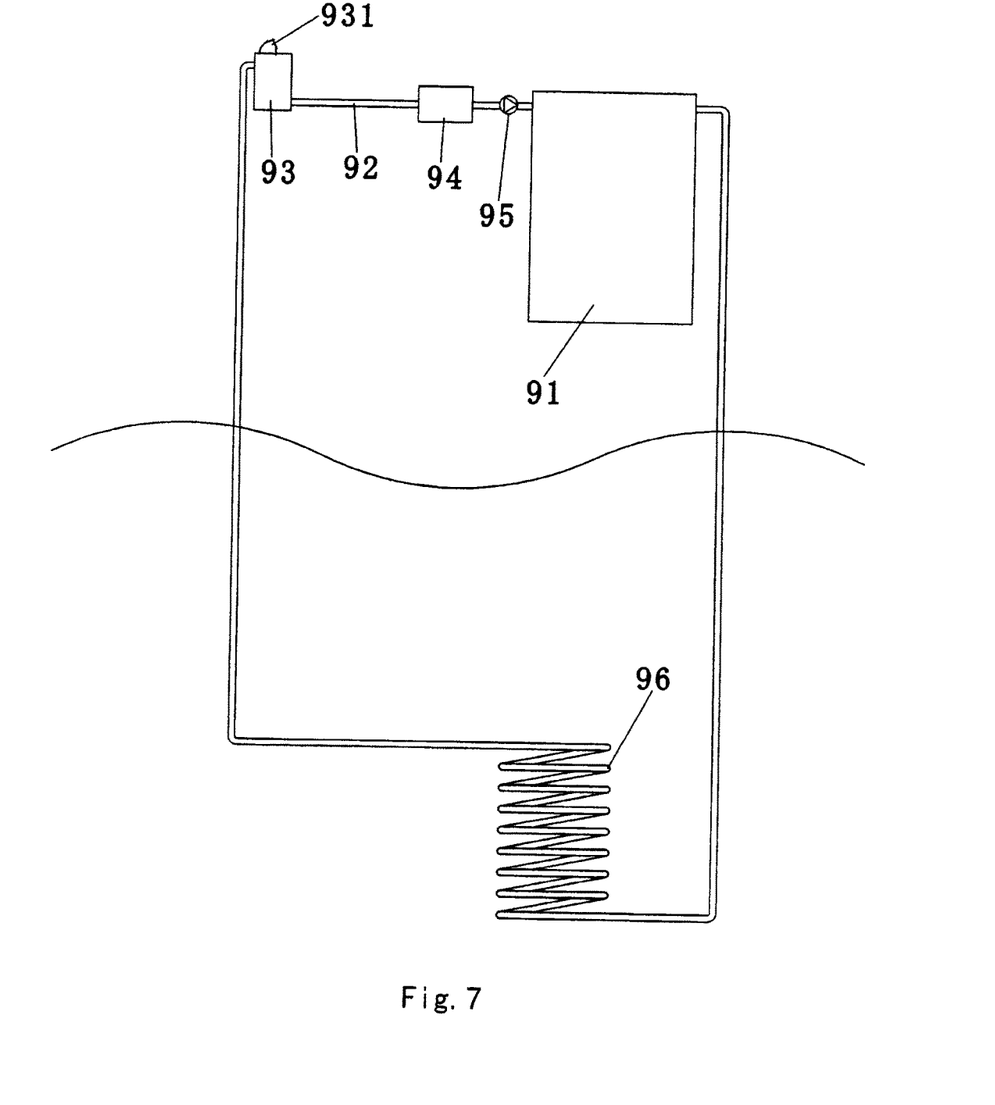
FIG. 7 is a schematic structural view of the cooling circulating circuit for the frequency converter.

A large amount of heat is generated in the operation of the frequency converter. The frequency converter is generally required to be cooled with a cooling system. The cooling system of the present disclosure is formed by connecting a heating element 91 of the frequency converter to a coolant storage tank 93, a coolant heater 94 and a coolant circulating pump 95 in series via a coolant tube 92 to constitute a cooling circulating circuit. The frequency converter, the coolant storage tank, the coolant heater and the coolant circulating pump is located in the control box. The coolant tube between the heating element of the frequency converter and the coolant storage tank partially extends below the water surface and is connected to a cooling coil 96 which is located at 2 to 3 meters below the water surface. In order to eliminate influence of the pressure generated by the hydrothermal expansion on the wall of the coolant storage tank, an opening is provided on the top of the coolant storage tank and an expansion bag 931 is nested onto the opening, as shown in FIG. 7.

The working principle of the above-mentioned water flow power generating device will be described below. In a normal operation, by adjusting the rotation angle of the rotating base of the rotating mechanism above the water surface, the tower is rotated such that the water flow travels just towards the impeller faces. The water flow continues to flow into the impeller without ending and drives the blades to rotate. Since the wheel ring nested onto the blades can generate buoyancy that is enough to counteract the impeller's own weight, the blades rotate rapidly without overcoming their own weight. All of the mechanical energy obtained from the rotation is converted into electric energy by means of the gear box and the generator. The electric energy is incorporated into the power grid after frequency conversion through the frequency converter and transformation through the transformer. When the sensor detects a change of the direction and flow rate of the water flow, the computer calculates the data from the sensor and timely adjusts the rotation angle of the rotating base of the rotating mechanism on the water surface to change the area of the impeller through which the water flow passes so as to achieve a stable power generation. When the impeller is required to be overhauled, by adjusting the rotation angle of the rotating base of the rotating mechanism on the water surface, the tower is rotated such that the front face of the impeller is perpendicular to the direction of the water flow. The blades will not be subject to the impact from the water flow and stay in a stationary state. The water flow usually carries foreign bodies. When the foreign bodies are needed to be removed from the impeller, by adjusting the rotation angle of the rotating base of the rotating mechanism on the water surface such that the tower is rotated so as for the rear face of the impeller to face the coming water flow, and continuous water flow will have a good flushing effect on the impeller.

When the central shaft of the impeller has been rubbing with the sealing ring for a long time which will cause the sealing ring to be worn out, a little water outside may penetrate into the gear box. Since the specific gravity of the water is larger than that of the oil, the water will sink into the water outlet pipe at the bottom of the gear box after entering the gear box. When the water is accumulated to a certain extent to reach the position of the moisture detection sensor, the data is read out by the sensor. The computer controls and opens the solenoid valve. Then the water is drained toward the water collecting tank. When the water in the water collecting tank is accumulated up to a certain position, the pumping device pumps the water out and sends the water out of the tower, thereby greatly reducing the maintenance frequency. When the lubricating oil in the gear box is deteriorated due to the friction caused by the gear meshing in the gear box, the oil in the gear box will be drained out as long as the solenoid valve in the oil storage tank and the solenoid valve in the water outlet pipe are simultaneously opened. Then new oil is charged through the water outlet pipe and the exchanging of the oil is completed, thereby greatly reducing the cost of maintenance.

Second Example

Figure 4:
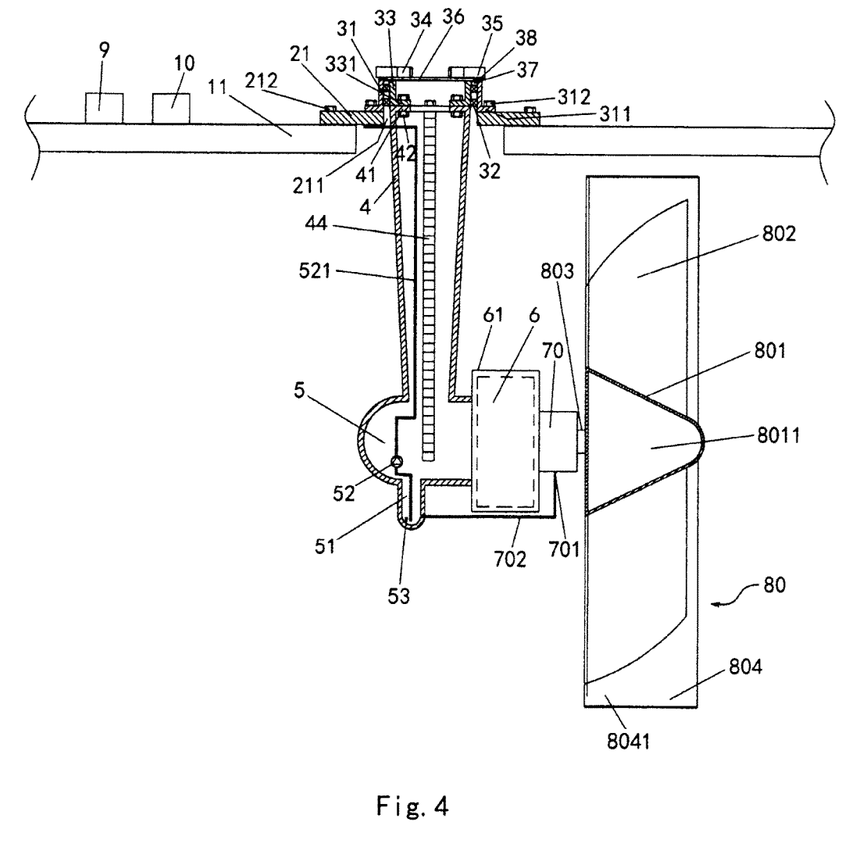
FIG. 4 is a cross-sectional schematic structural view of a water flow power generating device according to a second embodiment of the present disclosure.
Figure 5:
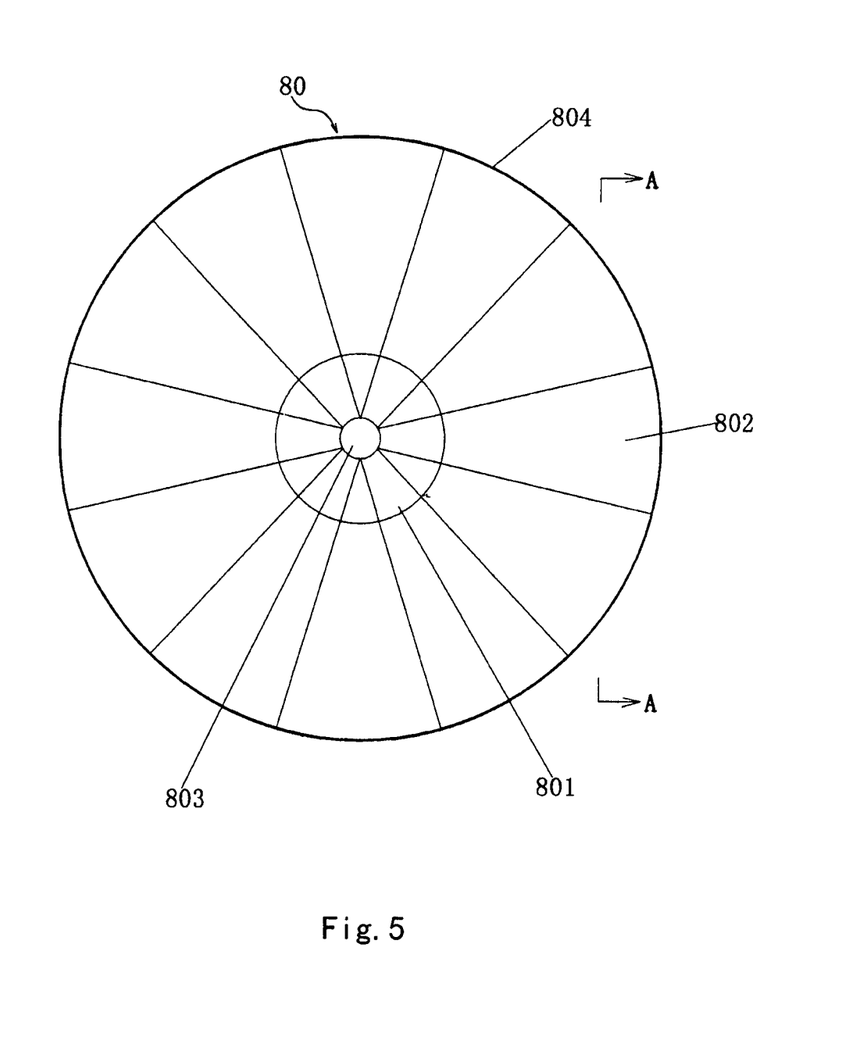
FIG. 5 is a schematic structural view of the front face of the impeller according to the second embodiment of the present disclosure.

FIG. 4 is a cross-sectional schematic structural view of a water flow power generating device according to a second embodiment of the present disclosure. FIG. 5 is a schematic structural view of the front face of the impeller according to the second embodiment of the present disclosure.

As shown in FIGS. 1, 4 and 5, the highly efficient water flow power generating device of the present disclosure includes a suspension frame 1, an installing platform 2, a rotating mechanism 3, a tower 4, a nacelle 5, a generator 6, a water drainage tank 70, a impeller 80, a control room 9 and a transformer 10.

The suspension frame 1 includes a "#" shaped frame constructed by welding a plurality of internal buoys 11 to each other and a square frame formed by a plurality of external buoys 12. The buoys are configured to be elongated cylindrical buoys. One end of the internal buoys away from center of the "#" shaped frame is fixed on the side wall of the external buoys. Each of four corners of the square frame is connected to a set of ropes 13 and ground anchors, respectively. The ground anchors are cast-anchored on the ground below the water surface so that the frames fixedly float on the water surface.

The installing platform 2 is configured to be a square metal plate 21 provided with a circular hole 211 at the center of the square metal plate 21. The upper end of the tower may pass through the circular hole 211. The outer edge of the metal plate 21 is fixed onto the sides of central opening of the "#" shaped frame by bolts 212.

The rotating mechanism 3 includes a fixed base 31, bearings 32, a rotating base 33, a motor 34, a speed reducer 35 and a fixed top plate 36. The fixed base is cylindrical and an annular lower edge 311 extends radially outwardly from the lower end face of the fixed base. The lower edge of the fixed base is fixed to the circumference of the central circular hole of the metal plate by bolts 312 and the top of the fixed base is connected to the fixed top plate 36. The rotating base is in the form of a cylindrical shape which has an outer diameter smaller than the inner diameter of the fixed base. The rotating base is connected to the fixed base via upper and lower bearings 32. An annular lower edge 331 extends radially inwardly from the lower end face of the rotating base. The outer side surface of the upper portion of the rotating base is provided with large gear teeth 38 that can be engaged with a pinion gear 37. The speed reducer is mounted on the fixed top plate. The motor is mounted on the speed reducer. The pinion gear is nested onto the output shaft of the speed reducer.

The tower 4 is inverted in the water. An annular upper edge 41 extends radially inwardly from the upper end face of the tower. The upper edge 41 is fixedly connected to the lower edge 331 of the rotating base via bolt 42. A ladder 44 is provided inside the tower from the water surface to the bottom of the tower.

The nacelle 5 is located at one end of the tower away from the water surface. A water collecting tank 51 is provided at the bottom of the nacelle. A water pumping device 52 and a moisture detection sensor 53 are provided in the water collecting tank. The generator 6 is located at one side of the nacelle. The generator adopts a high power generator in which the diameter of the rotor is 2 to 10 meters. A water drainage tank 70 is nested onto the front end of the rotating shaft of the generator. A water drainage hole 701 is provided at bottom of the water drainage tank, and the water drainage hole is communicated to the water collecting tank via a water outlet pipe 702. The water pumping device can direct the water outside the tower by a water pumping pipe 521. In order to avoid the influence of the magnetic field of the generator on the living creatures in the water, a magnetic field shielding layer 61 is inlayed outside the generator.

The impeller 80 consists of a hub 801 and a plurality of blades 802. The axis of the hub is parallel to the water surface. The hub includes a hollow cavity 8011. The size of the hollow cavity 8011 may be determined according to the impeller's own weight as long as the buoyancy of the wheel ring in the water can be counteracted by the impeller's own weight. The central shaft 803 of the impeller protrudes from the bottom surface of the hub. A wheel ring 804 is nested on distant end of each blade remote from the center of the hub. The wheel ring is configured to be a cylindrical structure. The distant end of each blade is connected to the inner side wall of the wheel ring at a torsional angle of 25° to 85°. The distance a from the intersection of leading edge and the distant end of each blade to the front end edge of the wheel ring is ¼ to ⅓ of the height d of the wheel ring, as shown in FIG. 6.

A platform 14 is provided between two internal buoys perpendicular to each other. A control room 9 and a transformer 10 are seated on the platform. The frequency converter is located in the control room. A computer, a switchgear cabinet, a power distribution box, an electric meter, a reactive power compensator, an emergency power supply, a monitoring equipment, a communication equipment and various control equipments are also disposed in the control room. In order to detect the direction and flow rate of the water flow in time, a water flow direction and flow rate sensor, not shown in the Figures, is arranged between the wheel ring and the water surface. The water flow direction and flow rate sensor is communicated to the computer in the control room. Then the computer calculates the data from the sensor and adjusts the orientation of the water wheel so as to achieve a stable power generation.

A large amount of heat is generated in the operation of the frequency converter. The frequency converter is generally required to be cooled with a cooling system. The cooling system of the present disclosure is formed by connecting a heating element 91 of the frequency converter to a coolant storage tank 93, a coolant heater 94 and a coolant circulating pump 95 in series via a coolant tube 92 to constitute a cooling circulating circuit. The frequency converter, the coolant storage tank, the coolant heater and the coolant circulating pump is located in the control box. The coolant tube between the heating element of the frequency converter and the coolant storage tank partially extends below the water surface and is connected to a cooling coil 96 which is located at 2 to 3 meters below the water surface. In order to eliminate influence of the pressure generated by the hydro-thermal expansion on the wall of the coolant storage tank, an opening is provided on the top of the coolant storage tank and an expansion bag 931 is nested onto the opening, as shown in FIG. 7.

The working principle of the above-mentioned water flow power generating device will be described below. In a normal operation, by adjusting the rotation angle of the rotating base of the rotating mechanism above the water surface, the tower is rotated such that the water flow travels towards the impeller. The water flow continues to flow into the impeller without ending and drives the blades to rotate. Since a hollow cavity in the hub of the impeller can generate buoyancy that is enough to counteract the impeller's own weight, the blades rotate rapidly without overcoming their own weight. All of the mechanical energy obtained from the rotation is converted into electric energy by means of the generator. The electric energy is incorporated into the power grid after frequency conversion through the frequency converter and transformation through the transformer. When the sensor detects a change of the direction and flow rate of the water flow, the computer calculates the data from the sensor and timely adjusts the rotation angle of the rotating base of the rotating mechanism on the water surface to change the area of the impeller through which the water flow passes so as to achieve a stable power generation. When the impeller is required to be overhauled, by adjusting the rotation angle of the rotating base of the rotating mechanism on the water surface, the tower is rotated such that the front face of the impeller is perpendicular to the direction of the water flow. The blades will not be subject to the impact from the water flow and stay in a stationary state. The water flow usually carries foreign bodies. When the foreign bodies are needed to be removed from the impeller, by adjusting the rotation angle of the rotating base of the rotating mechanism on the water surface such that the tower is rotated so as for the rear face of the impeller to face the coming water flow, and continuous water flow will have a good flushing effect on the impeller.

In the case that the speed of water flow is of 0.3 meters per second and the generator is a permanent magnet generator with a rotation speed of 16 revolutions per minute, the water flow power generating device of the disclosure can generate an amount of power generation shown below when impellers of different diameters are employed and gear boxes of different transmission ratio are located in different depths.

| Nominal power of power generation (kw) | Diameter of the impeller (meter) | Transmission ratio of gear box | Suitable depth of the water (meter) |
|---|---|---|---|
| 60000 | 100 | 280 | 103 |
| 55000 | 95 | 265 | 98 |
| 50000 | 90 | 252 | 93 |
| 45000 | 86 | 240 | 89 |
| 40000 | 81 | 226 | 84 |
| 35000 | 76 | 213 | 79 |
| 30000 | 70 | 196 | 73 |
| 25000 | 64 | 180 | 67 |
| 20000 | 57 | 160 | 60 |
| 15000 | 50 | 140 | 53 |
| 10000 | 42 | 118 | 45 |
| 5000 | 28.6 | 80 | 32 |
| 2000 | 18 | 50 | 21 |
| 1000 | 13 | 36 | 16 |
| 500 | 9.2 | 26 | 12 |

It can be know from the above data that the water flow power generating device of the present disclosure is of high efficiency of power generation and may generate a clean energy that can be widely popularized.

What is claimed is:

1. A water flow power generating device, comprising:
an installing platform, which, in operation, is positioned on a water surface,
a frequency converter and a transformer, which, in operation, are positioned above the installing platform,
an impeller positioned below the installing platform,
a generator positioned below the installing platform,
wherein the water flow power generating device further comprises:
a rotating mechanism located on the installing platform,
a tower that is vertically located in the water, the tower having an upper end fixed to the rotating mechanism, and
a nacelle that is located at a lower end of the tower opposite from the upper end of the tower,
wherein the impeller is composed of a hub, a plurality of blades, a central shaft, and an annular wheel ring that surrounds the blades, the central shaft of the impeller protrudes towards the generator in a horizontal direction and is connected to the generator, the annular wheel ring is connected to each blade of the plurality of blades at a distant end of each blade remote from a center of the hub, a side wall of the annular wheel ring being a first hollow structure, or the hub being a second hollow structure, or both the side wall of the annular wheel ring being the first hollow structure and the hub being the second hollow structure, and water displacement of the first hollow structure of the side wall of the annular wheel ring, or water displacement of the second hollow structure of the hub, or water displacement of both the first hollow structure of the side wall of the annular wheel ring and the second hollow structure of the hub being equal to a weight of the impeller;
wherein the installing platform is fixed on a suspension frame composed of buoys, a set ropes is coupled to the suspension frame at one end and to a set of ground anchors at another end, the suspension frame, in operation, is held in place on the water surface by the set of ropes and the set of ground anchors;
wherein a first electrical cable couples the generator disposed on one side of the nacelle to the frequency converter, the first cable is located in the tower, and the generator transmits electricity to the frequency converter via the first cable;
wherein a second electrical cable couples the frequency converter to the transformer, the electricity is transmitted from the frequency converter to the transformer via the second cable, the transformer is coupled to a power grid and the electricity from the transformer is output to the power grid; and
wherein each blade of the plurality of blades includes a leading edge and a trailing edge, the leading edge is further away from the generator than the trailing edge in a direction parallel to a rotation axis of the hub, the annular wheel ring further includes a front end edge and a back end edge, the front end edge is further away from the generator than the back end edge in the direction parallel to the rotation axis of the hub, the distant end of each blade is connected to the side wall of the annular wheel ring at a torsional angle when viewed in a radial direction that is perpendicular to the direction parallel to the rotation axis of the hub, and an intersecting point between the leading edge of each blade and the distant end of each blade is kept at a certain distance away from the front end edge of the annular wheel ring.

2. The water flow power generating device according to claim 1,
wherein a cross section of the side wall of the annular wheel ring parallel to the central shaft is a right triangle with a structure having a front end that is remote from the generator in the direction parallel to the rotation axis of the hub and a rear end that is wider than the front end in a radial direction of the wheel ring and is proximal to the generator in the direction parallel to the rotation axis of the hub.

3. The water flow power generating device according to claim 2,
wherein the buoys are configured to be elongated cylindrical buoys, and the suspension frame consists of a "#" shaped grating frame formed by crossing a plurality of internal buoys and a square frame formed by a plurality of external buoys,
wherein one end of the internal buoys away from center of the "#" shaped grating frame is fixed on a side wall of the external buoy and the installing platform is located at central opening of the "#" shaped grating frame, and
wherein each of four corners of the square frame is connectable to the set of ropes and the set of ground anchors, respectively.

4. The water flow power generating device according to claim 3,
wherein the rotating mechanism comprises a fixed base, bearings, a rotating base, a fixed top plate, a motor and a speed reducer,
wherein the fixed base is configured to be a cylindrical body the bottom of which is connected to the installing platform and the top of which is connected to the fixed top plate;
wherein the rotating base is configured to be a cylindrical body, the rotating base is connected to the fixed base via the bearings, the bottom of the rotating base is connected to the upper end of the tower, and a pinion gear which can be engaged with a large gear is disposed on an upper outer side surface of the rotating base; and wherein the speed reducer is mounted on the fixed top plate, the motor is mounted on the speed reducer and the pinion gear is nested onto an output shaft of the speed reducer.

5. The water flow power generating device according to claim 4,
wherein the installing platform is configured to be a metal plate, a circular hole through which the upper end of the tower can pass is provided at center of the metal plate, an outer edge of the metal plate is fixed onto the "#" shaped grating frame and the inner edge of the metal plate is connected to the fixed base of the rotating mechanism.

6. The water flow power generating device according to claim 1,
wherein the buoys are configured to be elongated cylindrical buoys, and the suspension frame consists of a "#" shaped grating frame formed by crossing a plurality of internal buoys and a square frame formed by a plurality of external buoys,
wherein one end of the internal buoys is further away from a center of the "#" shaped grating frame that is fixed on a side wall of the external buoy, the installing platform is located at a central opening of the "#" shaped grating frame, and
wherein each of four corners of the square frame is connectable to the set of ropes and the set of ground anchors, respectively.

7. The water flow power generating device according to claim 6,
wherein the rotating mechanism comprises a fixed base, bearings, a rotating base, a fixed top plate, a motor and a speed reducer,
wherein the fixed base is configured to be a cylindrical body, the cylindrical body includes a bottom end connected to the installing platform and a top end connected to the fixed top plate;
wherein the rotating base is configured to be a cylindrical body, the rotating base is connected to the fixed base via the bearings, the bottom of the rotating base is connected to the upper end of the tower, and a pinion gear which can be engaged with a large gear is disposed on an upper outer side surface of the rotating base; and
wherein the speed reducer is mounted on the fixed top plate, the motor is mounted on the speed reducer and the pinion gear is nested onto an output shaft of the speed reducer.

8. The water flow power generating device according to claim 7,
wherein the installing platform is configured to be a metal plate, a circular hole through which the upper end of the tower can pass is provided at center of the metal plate, an outer edge of the metal plate is fixed onto the "#" shaped grating frame and the inner edge of the metal plate is connected to the fixed base of the rotating mechanism.

9. The water flow power generating device according to claim 8, wherein a height of the tower is 10 to 55 m, a diameter of each blade of the impeller is 9 to 100 m, a number of the plurality of blades is 4 to 50, and a height of the wheel ring is 0.5 to 8 m.

10. The water flow power generating device according to claim 9,
wherein the central shaft of the impeller is connected to a rotating shaft of the generator via a gear box.

11. The water flow power generating device according to claim 10,
wherein an oil storage tank is provided in the tower near the upper end of the tower, and
wherein the oil storage tank is connected to the gear box via an oil feeding pipe, so that the pressure inside the gear box is slightly lower than the external pressure at the same level to ensure that a sealing ring between the central shaft of the impeller and the gear box is subject to a minimum pressure so as to prevent the oil in the gear box from leaking out.

12. The water flow power generating device according to claim 11,
wherein a water drainage hole is provided at bottom of the gear box, and the water drainage hole is communicated to a water collecting tank provided on bottom of the nacelle via a water outlet pipe, and
wherein a moisture detection sensor is arranged at the water drainage hole, a solenoid valve is arranged in the water outlet pipe, and a water pumping device is provided in the water collecting tank.

13. The water flow power generating device according to claim 12,
wherein the frequency converter is located in a control box in which a computer, a switchgear cabinet, a power distribution box, an electric meter, a reactive power compensator, an emergency power supply, a monitoring equipment, a communication equipment and various control equipments are disposed, and the control box and the transformer are located on a platform disposed between two internal buoys perpendicular to each other.

14. The water flow power generating device according to claim 13,
wherein a heating element of the frequency converter is connected with a coolant storage tank, a coolant circulation pump in series through a coolant tube to form a cooling circulating circuit,
wherein the frequency converter, the coolant storage tank and the coolant circulation pump are located in the control box on the installing platform,
wherein, in operation, the coolant tube between the heating element of the frequency converter and the coolant storage tank partially extends below the water surface and is connected to a cooling coil which is located at 2 to 3 meters below the water surface.

15. The water flow power generating device according to claim 9,
wherein the central shaft of the impeller is directly connected to the rotating shaft of the generator, the generator is a permanent magnet generator and the diameter of a rotor of the generator is 2 to 10 meters.

16. The water flow power generating device according to claim 15,
wherein a water drainage tank is nested onto a front end of the rotating shaft of the generator, the central shaft of the impeller passes through a circular hole disposed on a side wall of the water drainage tank and is then connected to the rotating shaft of the generator, and
wherein a water drainage hole is provided at bottom of the water drainage tank, and the water drainage hole is communicated to a water collecting tank provided on bottom of the nacelle via a water outlet pipe, and a moisture detection sensor and a water pumping device are provided in the water collecting tank.

17. The water flow power generating device according to claim 16, wherein a coolant heater is provided on the coolant tube between the coolant storage tank and the coolant circulation pump.

18. The water flow power generating device according to claim 17,
wherein, in operation, a water flow direction and flow rate sensor is arranged between the wheel ring and the water surface, the water flow direction and flow rate sensor is communicated to a computer in a control box, and the computer calculates the data from the sensor and adjusts an orientation of the water wheel so as to achieve a stable power generation.

19. The water flow power generating device according to claim 1,
wherein a cross section of the side wall of the annular wheel ring parallel to the central shaft includes an inclined surface.

* * * * *